United States Patent [19]

Poston

[11] 4,454,917
[45] Jun. 19, 1984

[54] THERMAL ACIDIZATION AND RECOVERY PROCESS FOR RECOVERING VISCOUS PETROLEUM

[75] Inventor: Robert S. Poston, Winter Park, Fla.

[73] Assignee: Carmel Energy, Inc., Houston, Tex.

[21] Appl. No.: 317,338

[22] Filed: Nov. 2, 1981

Related U.S. Application Data

[63] Continuation of Ser. No. 91,764, Nov. 6, 1979, abandoned.

[51] Int. Cl.³ .................. E21B 43/24; E21B 43/27
[52] U.S. Cl. .................................. 166/303; 166/307
[58] Field of Search ............ 166/271, 272, 281, 303, 166/307

[56] References Cited

U.S. PATENT DOCUMENTS

| 956,058 | 4/1910 | Elten | 166/303 |
|---|---|---|---|
| 2,265,923 | 12/1941 | Normand | 166/303 |
| 2,466,673 | 4/1949 | Mullady | 252/8.55 |
| 2,663,689 | 12/1953 | Kingston et al. | 252/8.55 |
| 2,675,083 | 4/1954 | Bond et al. | 166/303 |
| 2,679,294 | 5/1954 | Bond et al. | 166/303 |
| 2,763,326 | 9/1956 | Cardwell et al. | |
| 3,388,744 | 6/1968 | Fincher et al. | 166/303 |
| 3,530,939 | 9/1970 | Turner et al. | 166/303 |
| 3,543,856 | 12/1970 | Knox et al. | 166/307 X |
| 3,543,858 | 12/1970 | Nooner et al. | 166/303 |
| 3,948,323 | 4/1976 | Sperry et al. | 166/303 |
| 3,980,137 | 9/1976 | Gray | 166/303 |
| 3,993,135 | 11/1976 | Sperry et al. | 166/303 |
| 4,118,925 | 10/1978 | Sperry et al. | 60/39.05 |
| 4,136,739 | 1/1979 | Salathiel et al. | 166/300 |

Primary Examiner—George A. Suchfield
Attorney, Agent, or Firm—Pravel, Gambrell, Hewitt, Kirk & Kimball

[57] ABSTRACT

A thermal acidization and recovery process for increasing production of heavy viscous petroleum crude oil and synthetic fuels from subterranean hydrocarbon formations containing clay particles creating adverse permeability effects is described. The method comprises injecting a thermal vapor stream through a well bore penetrating such formations to clean the formation face of hydrocarbonaceous materials which restrict the flow of fluids into the petroleum-bearing formation. Vaporized hydrogen chloride is then injected simultaneously to react with calcium and magnesium salts in the formation surrounding the bore hole to form water soluble chloride salts. Vaporized hydrogen fluoride is then injected simultaneously with its thermal vapor to dissolve water-sensitive clay particles thus increasing permeability. Thereafter, the thermal vapors are injected until the formation is sufficiently heated to permit increased recovery rates of the petroleum.

5 Claims, 1 Drawing Figure

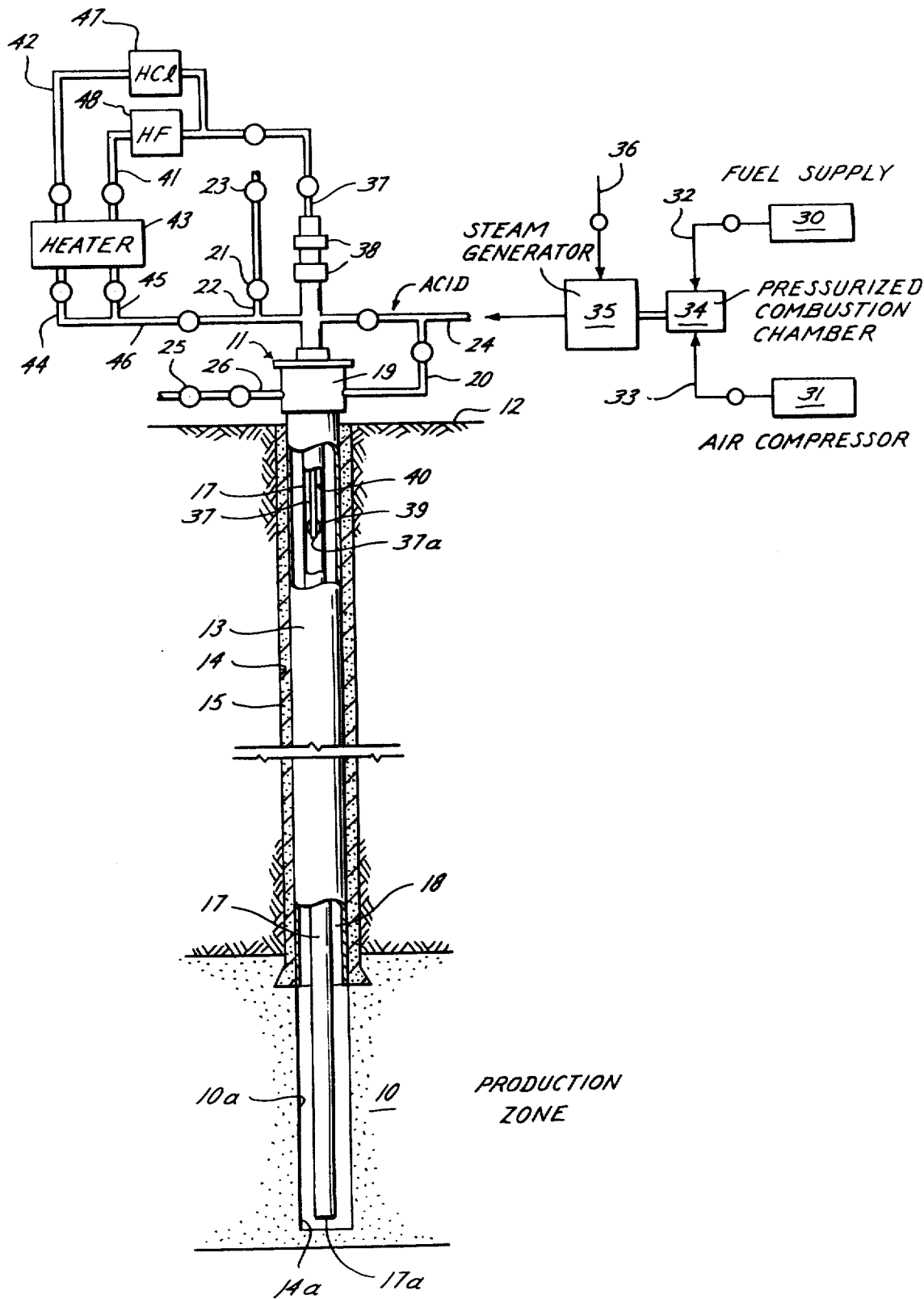

THERMAL ACIDIZATION AND RECOVERY PROCESS FOR RECOVERING VISCOUS PETROLEUM

The government of the United States of America has rights in this invention pursuant to Contract No. ET-C-03-2046 awarded by the U.S. Energy Research and Development Administration (now Department of Energy).

This is a continuation of application Ser. No. 91,764 (now abandoned), filed Nov. 6, 1979.

BACKGROUND OF THE INVENTION

This invention relates to a method for conditioning a subterranean formation containing clay particles creating adverse permeability effects around a well bore communicating from the surface of the earth to the formation in order to increase the recovery of heavy viscous hydrocarbon materials, such as petroleum crude oil or synthetic fuels. The presence of clay particles may create adverse permeability effects in the formation and particularly around the well bore by swelling if water-sensitive clays, particle plugging by dispersal of clay fines or by particle invasion of such fines. Such effects reduce permeability of the formation both to fluids injected for stimulation of production of viscous hydrocarbons and to the production of the hydrocarbons themselves.

There are many methods known in the art for injecting thermal energy into a formation for the purpose of reducing the viscosity of heavy viscous petroleum crude oil so that it may be recovered. Such methods are usually classified as "thermal drive", "single well thermal injection" or the like. Thermal drive processes basically involve injecting thermal energy, usually from steam boilers or in situ combustion, into an oil-bearing formation by means of an injection well, driving the petroleum towards one or more adjacent producing wells and recovering the petroleum through the producing wells. Single well thermal injection processes usually involve injecting thermal energy into the oil-bearing formation by means of an injection well and subsequently withdrawing the resulting heated petroleum through the same well. Such single well thermal injection processes are also commonly referred to as "huff-and-puff" processes. There are, of course, many modified versions of these basic techniques known in the art which employ a wide variety of thermal energy agents, such as hot water, in situ combustion gases, steam, heated condensable and non-condensable gases, and the like.

Although many thermal injection methods have been useful under certain conditions, there are many formations known to contain large volumes of heavy viscous petroleum from which the petroleum has not been economically and efficiently recovered by the employment of any known thermal injection technique. By way of example, there are many formations located throughout the United States, particularly throughout southern Illinois, western Missouri, southeastern Oklahoma, and southern Kansas, saturated with heavy viscous crudes, e.g., having viscosities greater than 200 centipoises and-/or API gravities below about 22° (both at 60° F.), which have not been recovered in economic quantities by employment of conventional recovery techniques. Additionally, previous attempts to increase the recovery of such heavy crudes from such formations by the employment of known thermal injection processes, especially direct single well steam injection, have been substantially unsuccessful. As known, one of the primary problems in attempting to recover such viscous crudes from such formations is that the formations have such low relative permeabilities to oil and water that thermal energy cannot be injected into the formations at economic injection rates. In fact, there are many formations which have such low relative permeabilities to oil and water that they will not accept sufficient quantities of thermal energy by the employment of known injection processes at any injection rate.

A recent patent discloses a method for enhancing petroleum production in such formation. For example, U.S. Pat. No. 3,993,135 discloses a method comprising initially heating a well bore penetrating the formation and surrounding subterranean strata with a thermal vapor stream containing combustion gases and superheated steam until sufficient heat is imparted thereto to permit the thermal vapor stream to be injected into the formation at a desired high injection rate. The well bore and surrounding strata are heated by continuously injecting the thermal vapor stream into the well and simultaneously venting a portion of the vapor stream from the well at the surface to remove condensed liquids formed from while heating the well bore and formation face. The heated fluid is then injected directly into the formation at a desired high injection rate until the formation and viscous petroleum contained therein are heated and the viscosity of the hydrocarbons is reduced. Injection is then discontinued and the heated crude is produced through the well. Surprisingly, and contrary to prior attempts, a formation having low relative permeabilities to water and oil will readily accept a thermal vapor stream containing steam at high injection rates when the heated fluid containing steam is injected in accordance with the process of U.S. Pat. No. 3,993,135. U.S. Pat. No. 4,118,923 describes apparatus particularly suited for generating a thermal vapor stream for use in the described method.

Best results are obtained with the above process when the heated fluid is injected at the maximum injection rate possible so as to impart heat to the formation as rapidly as possible. But it has now been found that the above process cannot be applied to maximum efficiency in those formations which clay particles which cause adverse permeability effects by swelling upon contact with water or being of such fine particle size that the particles migrate through the formation ultimately plugging the formation. Injection of a thermal vapor stream as described in U.S. Pat. No. 3,993,135 causes the fine particles to migrate through the formation to ultimately plug the formation. Where the clays are water-sensitive, swelling occurs. Such swelling lowers the already low permeability of such formations which lowers, for practical purposes flow of the thermal vapor stream into such formations and greatly impedes the recovery of petroleum from such wells. Additionally, when a continuous thermal drive technique is employed the presence of such clays within the formation around the drive well impedes the ability to drive the petroleum crudes from the field through the use of the injection well. Examples of such clays which adversely affect the permeability of such formation include, for example, illite, smectite, bentonite and montmorillonite.

Traditional treatment of such formations with hydrogen fluoride to dissolve the clay or with clay stabilizers has proved unsuccessful, partly because of the difficulty of removing carbonaneous materials, such as oil, from the clay particles. The coating of crude oil prevents the hydrogen fluoride from attacking and dissolving the clays. This result is partly because hydrogen fluoride reacts with calcium, magnesium and other metals contained in the formation to form insoluble metal fluoride salts which are deposited within the pores of the formation to further limit its permeability. Attempts to solve this problem, such as described in U.S. Pat. No. 4,136,739 illustrate the difficulty in treating formations with hydrofluoric acid and hydrochloric acid to solve the problems created by clay particles which adversely effect the permeability of oil-bearing formation. These problems are compounded when heavy viscous hydrocarbons are present in the formation. Further, conventional acidizing with hydrogen fluoride is very corrosive and causes considerable damage to the well bore.

Treatment similar to that described in the prior art was attempted where a liquid hydrocarbon, in this case diesel fuel, was injected into the formation to attempt to remove heavy viscous crude in the presence of such clay particles to make them susceptible to treatment with hydrofluoric acid failed. No increased permeability was noticed.

SUMMARY OF THE INVENTION

Applicant has now discovered a method by which the problems created by the presence of clay particles which adversely effect permeability in a formation containing highly viscous hydrocarbon materials such as petroleum crude oils and synthetic fuels are solved, allowing the formation to be stimulated by the injection of a thermal vapor stream comprising steam and combustion gases, such as, for example, carbon dioxide. The method of this invention comprises initially injecting the thermal vapor stream through the bore hole to clean that part of the formation in the vicinity of the bore hole of hydrocarbon crude oil to expose the clay particles; injecting vaporized hydrochloric acid simultaneously with the thermal vapor stream until calcium; magnesium and other metals, if present, in the formation about the bore hole have reacted to form water-soluble chloride salts; injecting vaporized hydrofloric acid simultaneously with the thermal vapor stream until sufficient amounts of the clay in the formation about the bore hole have been dissolved by the hydrofluoric acid; and, continuing to inject the thermal vapor into the formation until sufficient heat has been imparted thereto to permit the petroleum therein to be recovered at an improved recovery rate.

Where mobile, fine clay particles are present, a known clay stabilizer may be added with any of the injection steps after the crude oil has been cleaned from the clay particles to further assist in curing the problem converted with particulate migration.

Injection of hydrogen chloride and hydrogen fluoride sequentially, or simultaneously after some initial HCl injection, as a vapor at high temperatures insures that the formation about the bore hole may be properly conditioned for a distance of at least five feet of the bore hole to eliminate the problems caused by clay particles when the thermal vapor stream is employed to stimulate production of the viscous petroleum contained therein.

BRIEF DESCRIPTION OF THE DRAWING

The drawing is a schematic drawing, partially in cross-section, of a section of the earth, illustrating a well bore penetrating a petroleum-bearing formation and another means at the surface for introducing a thermal vapor stream into the well and formation. The drawing also illustrates a means for introducing and vaporizing hydrogen chloride and hydrogen fluoride with the thermal vapor stream, as well as the stabilizing compound, if desired, into the well and formation in accordance with the method of the invention. In the drawing the casing is partially broken away in order to show the details of one embodiment for injection and vaporizing hydrogen chloride and hydrogen fluoride simultaneously with the injection of the thermal vapor stream.

DETAILED DESCRIPTION OF THE INVENTION

It will be understood that the instant invention may be employed for the recovery of substantially any type viscous hydrocarbon materials, such as crude petroleum oil or synthetic fuel from substantially any type of subterranean formation containing clay particles which adversely effect the permeability of the formation. One of the primary advantages of this invention is that it provides for the injection of a thermal vapor stream containing combustion gases and steam at high injection rates thereby permitting the formation to be heated to a predetermined desired level at which the crude oil will be flowable in relatively short periods of time. However, the instant process is particularly useful for recovering heavy viscous crudes; e.g., those having viscosities greater than 200 centipoise (at 60° F.) and/or API gravities (at 60° F.) of about 22° or below, from subterranean formations having low relative permeabilities to water and oil and containing water-sensitive or fine, mobile particulate clays.

More specifically, the instant method is useful for recovering such highly viscous crudes from a formation where the low permeability of the formation is due, at least in part, to the swelling of water-sensitive clay particles which, when contacted with the thermal vapor stream, expand to inhibit the migration of the thermal vapor stream into the formation at distances more remote from the well bore or where mobile, fine clay particles migrate and plug the formation.

Many of such viscous crude-bearing formations having low relative permeabilities to oil and water are well-known, and are usually located within the range of from about 500 to about 2,000 ft. below the earth's surface. Included among such formations, by way of example, are those of Pennsylvanian sandstone, such as Bartlesville sandstone of the Cherokee group, which are known to be located throughout southern Illinois, western Missouri, southeastern Kansas and northeastern Oklahoma. Such formations often contain about 10% to 16% of troublesome clay particles.

The practice of this invention can be most easily understood by reference to the drawing. As illustrated, a producing formation 10 bearing heavy viscous petroleum is penetrated by a well 11 which has been drilled from the surface of the earth 12. The well 11 has preferably been completed in a conventional manner and includes a string of casing 13 set within a well bore 14 to the petroleum-bearing formation 10 and supported by a cement sheath 15. The well bore 14 has penetrated the petroleum-bearing formation and has been drilled to near the bottom of the desired formation injection zone. The well bore 14 may be left open as in an open hole completion or a screen or slotted liner or perforated casing (not shown) may be set in the well bore lower end 14a to support the walls of the well bore 14 Of course, the casing may be set all the way through the formation, cemented and perforated.

The well 11 also includes a string of tubing 17 disposed within the casing 13 and the well bore 14 extending through the formation 10 thereby forming annular space 18. Preferably, the tubing 17 extends downwardly to near the well bore lower end 14a. A conventional sealing device (not shown) is provided adjacent the top of the well head 19 to seal off the casing annulus 18 and maintain pressure within the well. In an optional embodiment to be discussed subsequently, a second short length of supplemental tubing 37 is included within the tubing 17 and forms a second annulus 40 therewith. Tubing 37 extends partially the length of tubing 17, terminates in opening 37a and is held in place by centralizer 389 which has openings therein (not illustrated) to allow fluid flow in tubing 17 pass centralizer 39. A conventional sealing device 38 is provided at the top of tubing 17 to seal off the second annulus 40 and maintain pressure within the well.

In the first step of the method of this invention the formation face 10a and surrounding strata adjacent the well bore 14 is preliminarily "preconditioned" to clean or remove viscous crude, paraffins, or other hydrocarbonaceous materials adhering to the particles of the formation—including clay particles contained therein—which could restrict flow of the thermal vapor stream into the petroleum-bearing formation 10.

In the first step in carrying out the method of the invention the well bore 14 and surrounding strata through which the well 11 extends to and through the formation 10 is initially heated by injecting a thermal vapor stream containing combustion gases and superheated steam; i.e., particularly carbon dioxide and superheated steam, into the annulus 18 through a valve-controlled pipe 20. The heated thermal vapor stream travels down the annulus 18 where part of it contacts and penetrates the formation face 10a and surrounding strata adjacent the well bore 14 while the remainder enters the open end 17a of the tubing 17, causing the thermal vapor and any condensed fluid as well as any hydrocarbonaceous material removed from the formation about the bore hole to pass upwardly through the tubing 17 where it is vented into suitable collection means (not shown) at the surface through a suitable venting means 23 connected with the surface end of the tubing 17, such as by pipe 22. The venting means 23 include a means for controlling the pressure in the tubing, such as a valve, restriction orifice, automatic operating valve or a combination of such devices. This pressure controlling means 23 is preferably installed between the end of the pipe 22 and a valve 21.

If desired, the thermal vapor stream may be injected into the tubing 17, such as through piping 24 connected therewith and vented at the surface from the annulus 18 by appropriate venting pressure controlling means 25 mounted with pipe 26. However, annulus injection and venting through the tubing 17 for heating and cleaning the well 11, the casing 13 and surrounding strata is preferred.

The injection of the thermal vapor stream into the well 11 contacts the tubing 17, casing 13 and the formation face 10a may cause, depending upon the formation temperature, substantially simultaneous condensation of condensable fluids, e.g., steam, in the thermal vapor stream which may collect in the well bore 14. If the rate at which the fluid condenses in the well bore 14 is greater than the rate which the formation can accept at the injection pressure employed, the well bore 14 starts to accumulate fluids usually at the bottom 14a. As these fluids accumulate they reduce the area of the formation injection zone which in turn reduces the injection rate of the heated fluid into the formation. As this condition continues, the level of condensed fluids can rise to a level in the well bore 14 and formation 10 where it effectively seals off the entire formation injection horizon and the maximum injection rate of the heated fluid into the formation may drop to near zero.

However, by simultaneously venting, as described previously and taught by U.S. Pat. No. 3,993,135, which is incorporated herein by reference for all purposes, the injected thermal vapor stream at the surface through the pressure control means 23 any condensed liquids formed and collected in the well bore 14 are forced into the tubing 17 through its open lower end 17a and are forced or lifted towards the surface. The simultaneous venting step thus sweeps the condensed liquids from the well bore 14 thereby eliminating the aforementioned blockage problems.

The thermal vapor stream is preferably continuously injected and simultaneously vented until the well and surrounding subterranean strata are heated sufficiently to substantially eliminate condensation of the heated fluid within the well 11 or at least reduce the amount of condensation to a level which the formation will accept without causing the aforementioned blockage problems. The time required will vary widely, depending upon well location, depth, and surrounding strata temperatures, types of strata, etc. and is best determined emperically, such as by directly injecting the thermal vapors into the formation by discontinuing venting and observing whether a desired high formation injection rate can be maintained.

The thermal vapors may be injected into the well 11 at any desired rate to impart heat through the well and surrounding subterranean strata. However, it is prefered to employ the maximum injection rate possible so as to impart heat as rapidly as possible. Such maximum injection rates may be obtained by employing an injection pressure practiceable below the formation fracture gradient pressure which may be readily determined, if desired, by known techniques. More specifically, it is preferred to employ an injection pressure within the range of from about 200 to about 1500 psig (14 to about 105 kg/cm$^2$ gauge). Again, such injection procedure is described in U.S. Pat. No. 3,993,135, previously incorporated by reference.

Further, the thermal vapor stream is vented at the surface at a rate sufficient to keep the gas velocity in tubing 17 high enough to lift any condensed liquids formed and collected in the well bore 14 towards the surface so as to keep it substantially free of liquids while maintaining substantially full pressure on the formation. This may be readily accomplished by the employment of the aforementioned appropriate vent pressure control means at the surface, such as a valve, restriction orifice or like device in the conventional manner to provide a gas velocity in the tubing within the range of from about 10 to about 40 ft./sec. (3 to about 12 meters/second).

During the above-mentioned injecting and venting the heated fluid through the well 11 the formation face 10a adjacent the well bore lower end 14a is continuously exposed directly to the heated fluid, thereby gradually increasing its temperature and the temperature of the heavy viscous petroleum therein. This "pre-conditioning" of the adjacent formation face cleans the well bore 14 and formation face 10a of viscous crude, paraffins, or materials which could tend to restrict flow of the thermal vapors into the petroleum-bearing formation 10. It also exposes the clay particles which adversely effects permeability and makes them susceptible to further treatment.

The thermal vapor stream preferably employed to heat and clean the formation face of the well 11 and surrounding subterranean strata is usually a mixture of superheated steam and combustion gases essentially free of solid carbonaceous particles. Such a mixture of steam and combustion gases are preferably produced as described in U.S. Pat. Nos. 3,993,135, 3,948,322 and 4,718,925, all incorporated herein by reference for all purposes. Any process and apparatus known in the art can be employed for injecting such steam-gas mixtures with a mixture of carbon dioxide and steam being particularly useful.

It is preferred to employ a steam-gas mixture which is produced by initially burning a hydrocarbon fuel, such as diesel oil, gasoline, heating oil, natural gas, propane, butane, lease crude, etc. in the presence of substantially stoichiometric quantities of pressurized air under relatively high pressures, e.g., within the range of from about 200 to about 1500 psig and contacting the resulting pressurized combustion gas stream with water as described in the aforementioned patents. As illustrated in the drawing, this may be carried out by simultaneously injecting a hydrocarbon fuel from a suitable fuel storage supply 30 and a pressurized stream of air produced by a suitable air compressor 31 through suitable piping 32 and 33 respectively, into a pressurized combustion chamber 34 specifically designed for high pressure combustion, such as the one described in U.S. Pat. No. 4,118,925, wherein the fuel is burned under high pressure. The quantities of fuel and pressurized air are regulated to provide essentially complete combustion in the pressurized combustion chamber 34, resulting in a pressurized combustion gas stream essentially free of solid carbonaceous particles, e.g., soot.

The pressurized combustion gases, usually having a temperature within the range of from about 2,000° to about 4,000° F., is then passed into a steam generator 35 where it is contacted with water provided through suitable piping 36 to form steam. The resulting mixture of combustion gases and superheated steam forming the thermal vapor stream, can then be injected into the well annulus 18 through piping 20 or into the well tubing 17 through piping 24 under any pressure within the range of from about 200 to about 1500 psig, depending upon the formation fracture pressure gradient to enter the formation at a temperature within the range of from about 550° to about 700° F. The temperatures stated are illustrative, with the important consideration being that the thermal vapor stream enters the formation with superheated steam. At such temperatures and pressures, the thermal vapor stream is injected into the well 11 for heating it and the surrounding strata, described hereinabove, or directly into the formation at steam-gas injection rates within the range of from about 200,000 to about 2 million standard cubic feet per day (scfd) and heat injection rates within the range of from about 20 million to about 250 million BTU heat per day.

In accordance with the inventive method, after the surrounding strata is sufficiently heated and the clay particles substantially cleaned of hydrocarbaneous materials, vaporized hydrochloric acid is injected simultaneously with the thermal vapor stream through the well bore and thereafter vaporized hydrofluoric acid is injected simultaneously with the thermal vapors. This injection allows for solubilization or stabilization of the clay particles which would, without this treatment, adversely effect the permeability of the formation.

With reference to the drawing, acid injection may be accomplished by adding it directly to the supply line 24 through which the heated fluid is injected into the well. After that, the acid added to the supply line will vaporize as a result of contact with the heated fluid. This method is not preferred because it exposes the mild steel of the supply line to the corrosive effect of the acid. The acid in the vapor phase is less corrosive than its liquid counterpart. Thus it is preferred to vaporize the acid prior to its admixture with the heated fluid. This may be accomplished by employing hydrogen chloride or hydrogen fluoride gas rather than aqueous solutions of these acids. In this event, it is merely necessary to inject the hydrogen chloride or hydrogen fluoride directly into the thermal vapor injection line 24. Upon mixture with the thermal vapors, the hydrogen chloride or hydrogen fluoride will become heated to the same temperature of the thermal vapors. It is important to avoid corrosion that the temperature of the mixture of thermal vapors and the acid mixture be above point which the hydrogen chloride or hydrogen fluoride, as the case may be, will condense.

Alternately, an aqueous acid solution may be heated to vaporization in a heater 43, prior to injection via conduit 46 into tubing 17 where it becomes mixed with the thermal vapor, which is simultaneously injected into tubing 17. This method requires a heater 43 constructed of a corrosive resistant metal.

In a preferred method of acid injection, the heat value of the thermal fluid is utilized to vaporize an acid solution and raise it to a sufficient temperature such that the mixture enters the formation at a temperature above the dew point of the mixture. In this embodiment, acid solution is pumped from reservoir 47 or 48 to supplementary tubing 37. Supplementary tubing 37 is constructed of a corrosive resistant steel such as Hastelloy B. Simultaneously with the injection of acid solution through supplementary tubing 37, thermal vapors are being injected into tubing 17 and passing down annulus 40 in a heat exchange relationship with supplementary tubing 37. Tubing 17 and supplementary tubing 37 form a heat exchanger in which acid flowing through supplementary tubing 37 becomes vaporized prior to passing through opening 37a where it becomes mixed with the thermal vapors in one preferred embodiment of this invention.

Sufficient hydrochloric acid is injected into the formation surrounding the bore hole in order to react with such calcium and magnesium compounds as may be contained in the formation to form water soluble metallic chlorides. The hydrogen chloride treatment when such compounds are present prepares the formation for hydrofluoric acid injection. If hydrofluoric acid were injected without prior hydrochloric treatment, the hydrofluoric acid would react with the calcium and magnesium, if present in the formation, to form insoluble metallic fluorides which would deposit within the pores of the formation and impair its permeability. The amount of hydrochloric acid needed can be readily determined by core analysis of the formation.

Preferably a 35%, by weight, aqueous solution of hydrochloric acid is used as a source of hydrogen chloride even though anhydrous hydrogen chloride gas may be used. The rate of addition is adjusted such that about 5 to about 30 gallons of such 35% solution is used per hour preferably from about 5 to about 10 gallons per hour. Greater or lesser amounts of hydrochloric acid may be used with the heating time being varied accordingly.

The injection of hydrochloric as a vapor at elevated temperatures above the dew point simultaneously with the injection of the thermal vapor is important to insure that the hydrochloric acid will be carried into the formation adjacent the well bore for a distance of at least 5 feet. The amount of hydrochloric acid necessary to treat the formation around the well bore for the required distance of at least 5 feet may readily be determined by determining the calcium and magnesium content of the formation from a core sample or samples of formation fluids. It is preferred to employ an excess of hydrochloric acid to ensure that the formation is properly preconditioned for the subsequent hydrofluoric acid treatment.

After the hydrochloric acid injection, the well is acidized with hydrofluoric acid in order to remove the troublesome clay particles in that part of the formation which surrounds the well bore 11. Hydrofluoric acid injection may be accomplished in substantially the same manner, and with the same temperature requirements, as hydrogen chloride injection. That is, the hydrofluoric acid may be added as a gas to the heated fluid supply line 24 as an aqueous solution, usually 70% by weight hydrofluoric acid, which is vaporized in a heater 43 prior to injection, or injected as an aqueous solution which is vaporized by indirect heat exchange with the thermal vapors in the same manner as previously described which is simultaneously injected into the well.

The hydrofluoric acid usually amounts to about 3%, by volume, of the amount of thermal vapor being injected. Lesser amounts may be acceptable but would require additional times of injection and greater amounts may cause corrosion and do not normally result in significant reduction in injection time. The preferred range is from about 2% to about 6%. This amount is easily accomplished by injection of from about 5 to about 30 gallons per hour, preferably from about 5 to about 10 gallons per hour, of a 70% weight solution of aqueous hydrofluoric acid.

Injection of hydrofluoric acid as a heated vapor simultaneously with the injection of the thermal vapors at temperatures above the dewpoint of the mixture insures that the hydrofluoric acid will be carried into the formation surrounding the bore hole for a distance of about 5 feet or more. The hydrofluoric acid then reacts with the clay particles of the formation in the immediate vicinity of the well bore to render them incapable of swelling. A surfactant may optionally be added to the hydrofluoric acid to be injected to increase the activity of such acid in its removal of the clay particles.

In those formations where plugging of the pores within the formation is caused by the migration of very fine clay particles which are either removed from the sandstone substrate or are suspended in the pore volume fluids, known clay stabilizing compounds may be added, usually simultaneously with hydrofluoric acid injection. This clay stabilizing compound added to the 70% weight solution of aqueous hydrofluoric acid in quantities of from about 0.003 gallons to about 0.5 gallons of clay stabilizing compound per gallon of 70% by weight hydrofluoric acid with a rate of about 0.1 to about 0.30 gal. of clay stabilizing compound per gallon being preferred. The acid stable organic clay stabilization compound will attach itself to these very fine clay particles and render them immobile; thus, preventing their migration and subsequent plugging. Of course, once the clay particles have been cleaned of the hydrocarbonaceous coating the stabilizing additive can be used. One particularly useful clay stabilizer is "Cla-Sta B" sold by the Halliburton Company which is an aqueous solution of ammonium chloride containing 30% weight of a quaternary polymer.

In accordance with the inventive method, after the well 11 and surrounding strata have been sufficiently heated and cleaned and the permeability has been increased by the treatment described hereinabove, injection of the thermal vapors is continued directly into the formation at the maximum injection rate possible as described in the aforementioned patents. Formation injection is then continued until sufficient thermal vapor has been injected to raise the formation temperature sufficiently to permit the heated petroleum to flow to the well bore 14 for recovery to the surface by the employment of conventional production means. The injection necessary depends upon formation permeability, crude viscosity, formation fluid composition and the like, all well-known to those having ordinary skill in the art.

In carrying out the inventive method, the thermal vapors are continuously injected into the formation until it has sufficiently heated the formation, usually about 150 million BTUs. It is preferred to establish and maintain a formation injection rate averaging at least 50 million BTU per day and at least 500,000 scfd thermal vapor in order to permit petroleum recovery as rapidly as practicable. However, often times such injection rates are not obtained at initial formation injection and oftentimes the formation injection rate diminishes below such levels before the formation has been heated to the desired extent due to blockage problems caused by condensed liquids forming and collecting in the well bore and adjacent injection zone of the formation. It is believed that this is caused by the well and surrounding strata being insufficiently heated. However, it has been discovered that this problem can be overcome by discontinuing direct formation injection and further heating the well 11 and surrounding strata by injecting and simultaneously venting the steam-gas mixture through the well as described above. By alternating the well bearing injection and direct formation injection, the direct formation injection rate is increased and stabilized. Also, the injection can be halted and the formation allowed to "soak" with the injected thermal vapors further improving permeability to accept additional thermal vapor injection.

Therefore, whenever the formation injection rate diminishes or is initially established at a rate below about 20 million BUT per day heat, preferably below about 50 million BTU per day heat, the alternate injection procedure may be employed.

After the formation 10 has been heated to the desired extent, direct formation injection is discontinued at the surface and the heated, now mobile petroleum is withdrawn and collected at the surface through the well 11 by the techniques, such as natural flow, pumping, and the like, all well-known in the art. If desired, the formation may be allowed to "soak" for a desired length of time prior to petroleum withdrawal to allow the thermal vapor to dissipate through the formation interstices, impart heat to the formation strata and petroleum and to allow the petroleum, in its heated, more mobile state, to be easily removed from the formation 10 through the well 11.

Into a well in southwestern Missouri containing a 21° API gravity crude was injected a thermal vapor stream prepared as described in U.S. Pat. No. 4,118,923. A total amount of about 300 million BTU were injected. Upon entering the production cycle, only about 6 barrels of oil was recovered per day for five days and the production dropped to near zero.

It was attempted to acidize the well by cleaning clay particles at normal reservoir temperatures (70°-80° F.) with diesel oil followed by injection of liquid 70% HF to which Cla-Sta B (The Halliburton Co.) had been added. Attempts to stimulate the formation followed by the injection of thermal vapors but no production of crude oil resulted.

The well was then treated by injecting sufficient thermal vapors, carrying approximately 50 million BTUs of heat at a temperature of from about 550°-650° F. and about 300 psig. Without ceasing the heat injection, over the next two hour period, 55 gallons of 35% (wt) aqueous hydrochloric acid was added to the thermal vapors. Then, over a two hour period 55 gallons of 70% (wt) aqueous hydrofluoric acid was added to the thermal vapor stream. One quart of Halliburton Cla-Sta B was added to the hydrofluoric acid. After the addition of the hydrofluoric acid was complete additional thermal vapors were injected until a total of about 150 million BTU had been put into the formation. The well then began production at a rate of about 35 barrels of oil per day. Another well in the same field and pay zone was similarly treated and had a production rate as high as 60 barrels per day. Of course, in fields of this nature it is well known that production falls off as the formation cools and requires more heat injection. The period of time however can be as long as 4-6 months.

From the foregoing description, those skilled in the art will be able to arrive at many variations of the same without departing from the scope of the claimed invention.

I claim:

1. A method for recovering a heavy viscous petroleum crude oil having an API gravity, at 60° F., of 22° or less from a subterranean formation containing clay particles creating adverse permeability effects, penetrated by a well bore, consisting of the steps of:

injecting a thermal vapor stream through the well bore, into the subterranean formation at high rates, to contact clay particles at a temperature of from about 550° to 650° F., and at a maintained pressure of from about 200 to about 1500 psig, which is below the formation fracture gradient pressure required for acid fracturing, to remove crude oil from the clay particles adjacent the well bore to expose the particles to the thermal vapor stream, said thermal vapor stream consisting of combustion gases obtained from combustion of hydrocarbon fuels at high pressures mixed with superheated steam;

injecting into the thermal vapor stream sufficient quantities of hydrogen chloride at a rate of from about 5 to 30 gallons of about 35 wt % of aqueous hydrochloric acid per hour to be vaporized by the heat content of the thermal vapor stream, when added as an aqueous solution, and to contact the exposed clay particles to react with magnesium and calcium salts in the particles;

injecting into the thermal vapor stream sufficient quantities of hydrogen fluoride at a rate of from about 5 to 30 gallons per hour of aqueous hydrofluoric acid having a concentration of about 70 wt % for a time sufficient to dissolve clay particles and improve permeability of the formation, said hydrofluoric acid, when added as an aqueous solution, being vaporized by the heat content of the thermal vapor stream;

ceasing acid injection;

continuing injection of the thermal vapor stream into the formation for sufficient time to reduce the viscosity of the petroleum crude while maintaining the formation pressure well below the formation fracture gradient pressure required for acid fracturing; and recovering the crude oil from the formation.

2. The method of claim 1 wherein hydrofluoric acid is introduced into the well bore as a gas.

3. The method of claim 1 wherein steps (a) through (c) are continued until that part of the formation within a radius of about five feet of the bore hole is treated.

4. The method of claim 1 wherein the injection of hydrogen chloride is ceased prior to the injection of hydrogen fluoride.

5. The method of claim 1 wherein the hydrogen chloride or hydrogen fluoride is injected into the thermal vapor stream as a gas.

* * * * *